Nov. 3, 1942.                B. AMES                    2,300,837
ELECTRIC COOKER
Filed May 14, 1940              4 Sheets-Sheet 4

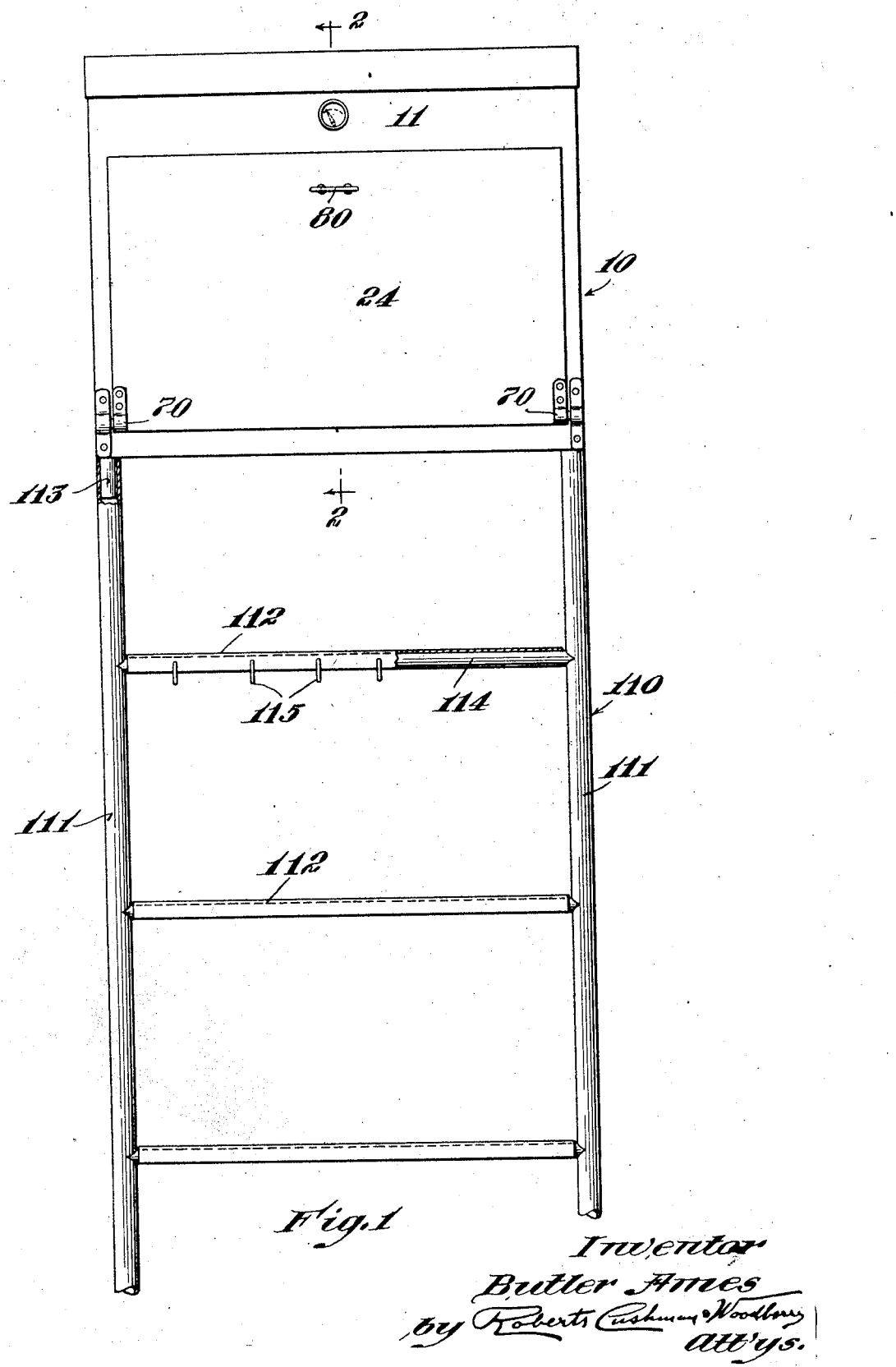

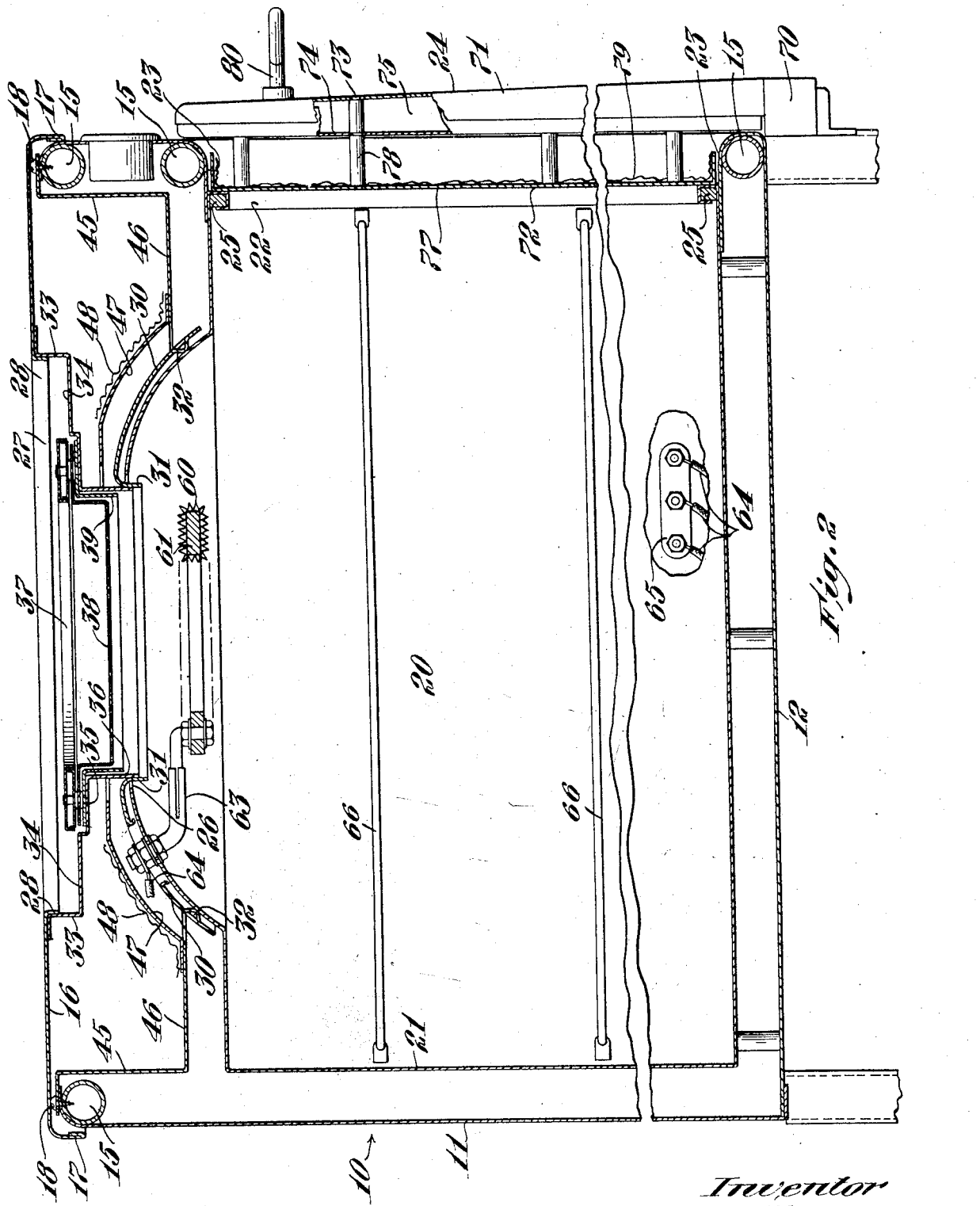

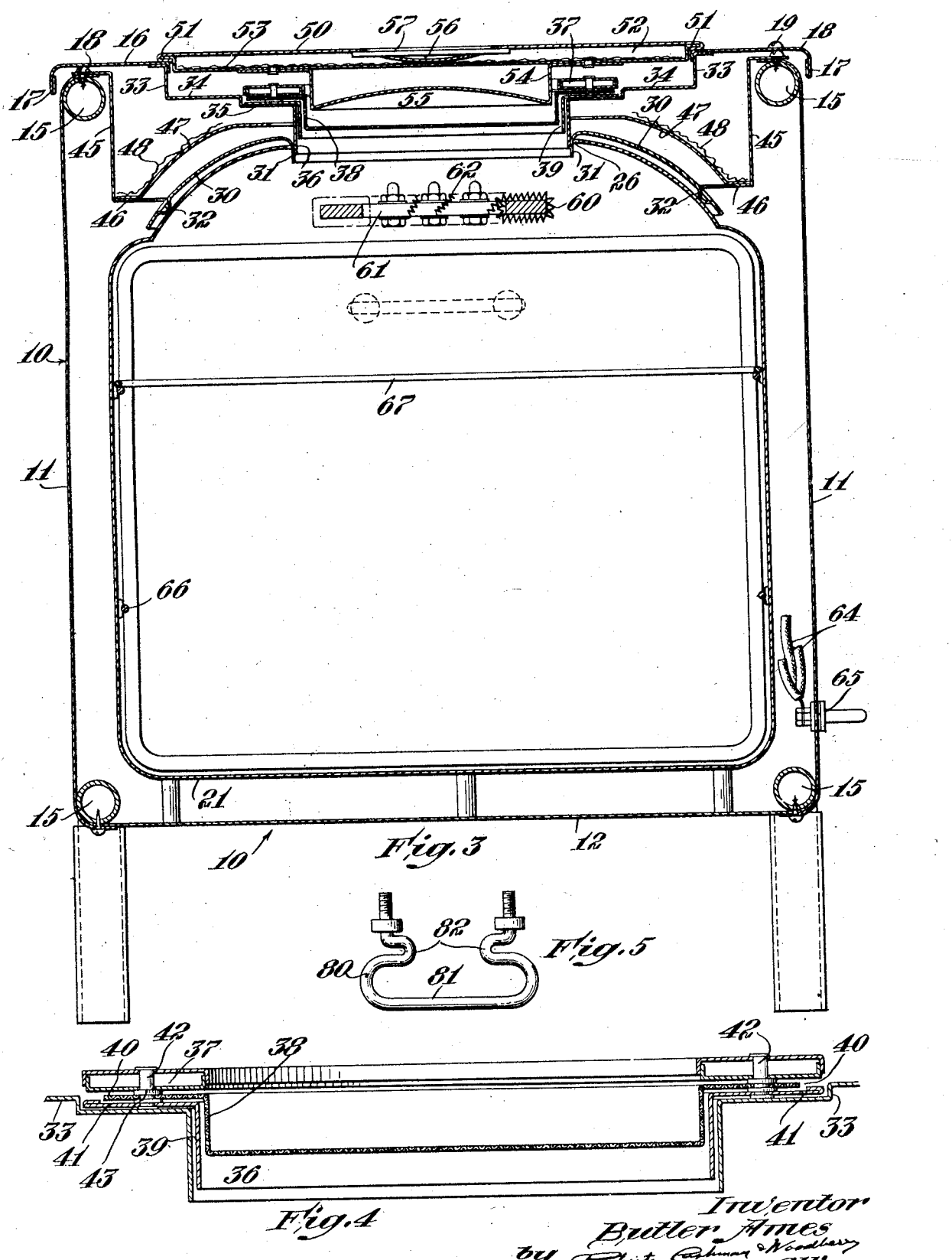

Inventor
Butler Ames
by Roberts Cushman & Woodberry
Att'ys.

Patented Nov. 3, 1942

2,300,837

UNITED STATES PATENT OFFICE 2,300,837

ELECTRIC COOKER

Butler Ames, Boston, Mass.

Application May 14, 1940, Serial No. 335,034

15 Claims. (Cl. 219—35)

This invention relates to improvements in electrically heated cooking apparatus and more particularly to a cooker including an oven and a cooking top and with a single source of glowing radiant energy so arranged that cooking may be carried on on top of the oven as well as within it, either simultaneously or selectively—the oven being self-cleaning and provided with means whereby smoke or odors evolved during the cooking within the oven are eliminated, and to novel features of construction of the oven and to novel cooking utensils designed for use with the oven, all as hereinafter described and claimed; the invention herein specifically disclosed and claimed involving improvements upon the apparatus disclosed and claimed in my copending applications for Letters Patent Serial No. 155,946, filed July 27, 1937, and Serial No. 239,613, filed November 9, 1938, now Patent No. 2,224,945, granted December 17, 1940, and No. 2,247,626, granted July 1, 1941, respectively.

It has been discovered that when foodstuffs are subjected to radiant glowing heat (direct and reflected and of the proper wave length) at about atmospheric pressure in a container in which the amount of gaseous oxygen or air is quite limited, the hydrocarbons or greasy gases evolved during the cooking can be destroyed or reduced to carbon dioxide, carbon monoxide, or water, and rendered odorless and smokeless with but a small residue of light mineral ash remaining.

In order that these conditions may be met when using a limited source of heat energy, such as the usual lighting circuit available in a dwelling house, the following factors are apparently necessary.

(1) The stove or oven should have a generous opening at its top but at the same time it should be practically closed or closable at its bottom so that there may be no upward circulation of air through the cooking chamber.

(2) The heat source should be inside of and as near the top of the cooking chamber as is permissible, having regard to the melting point of the material forming the top of the oven and provided with a proper directional reflector for the radiant energy.

(3) The material which forms the lining for the oven and defines the space within which cooking is to take place should be of low light-absorbent capacity but a good heat conductor, and substantially impervious to glowing radiant heat, and should have a fairly high specific heat.

(4) Since materials such as just referred to are relatively poor radiators of heat, it is necessary, in order to make the best possible use of the heat energy in destroying the odors or smoke which are emitted in cooking, that the vapors or gases which are evolved during cooking and not destroyed in the direct and reflected radiations from the source should be conducted to pass in close proximity to the heated material in order that they may be highly heated by contact with the metal and by the heat radiated therefrom.

(5) The glowing radiant energy from the heating element provides, at one and the same time, the heat necessary for the cooking as well as for the destruction of the smoke and odors arising therefrom.

This "destruction" is brought about partly by the glowing radiant energy directly and in part by the heat radiated to the vapors (with their odors and smoke) as they pass "in close proximity" through the highly heated passageways after leaving the oven.

Therefore the heating element should be as much as possible of refractory material and of such a shape (flattish) as to radiate the maximum of its energy upwards and downwards.

(6) For quick (and consequently tender) broiling of greasy foods it is desirable to utilize to the fullest the heat energy available. As the broiling is done in the direct and reflected radiation of the glowing heat of the oven it is necessary to keep the oven clear of smoke and cooking vapors which, like a fog in sunshine, would interfere with and delay the cooking action of the radiant, glowing heat. To accomplish this the food is placed in the oven (which may be preheated) on a grill resting on a cool or cold metallic vessel that will condense much of the vapors generated in the broiling; and prevent the heated, falling greases from being converted into steam and smoke on the bottom or sides of the oven.

This cooling vessel may be made in two ways; one to be used with and the other without water for cooling purposes. In either case the vessel should be made of a material relatively non-light-absorbent, of high heat conductivity and of high specific heat. In the vessel without water, a heavier weight of material must be used than when the vessel is so designed as to contain some water. In the latter case the water adds a high cooling effect—though the water is not exposed to the direct and reflected radiant glowing heat.

In any case the specific heat of the cold or cooling vessel must be such that in the time necessary to complete the broiling, it will condense and keep relatively cool the heated vapors and greases that fall therein, thus conserving the fats tried out in the broiling and permitting the full effect of the radiant glowing heat from the heating element to act upon the food.

(7) In a stove in which the one compact heating element is centrally located within and near the top of the oven, certain provisions must be made to accomplish every kind of cooking therein.

In the ordinary oven the heat rises. Here the heat must come down to the cooking vessels and food, either by direct radiation or by conduction through the sides of the oven or the cooking vessels used therein.

This is particularly true if it is desired to perform at one and the same time, in the same stove, several different kinds of cooking (such as baking, roasting and steaming and frying) without interference of any kind by one with another, or the mixing or odor or spoiling of taste.

While some cooking can be performed as ordinarily in the unobstructed radiation from the heating element, it is desirable to be able to shield some kinds of food from the direct heat radiation.

If in baking loaf bread the dough be subjected to the glowing radiation as well as the reflected radiation from the walls of the oven, an undue and perhaps undesirable browning or even burning of the exposed dough would result before the entire loaf was properly cooked.

Similarly, vegetables (not in water) exposed to this radiation would be dried and burnt on top—with consequent odor.

In the cooking and browning of all foods, the presence of water either as water or vapor is necessary in order to preserve the flavor. In the ordinary stove, oven basting of meats, etc., is accomplished by repeatedly ladling or pouring the hot, water-bearing greases (that have fallen to the bottom of the cooking pan) over the meat and subjecting it again to the heat radiation from the oven; thus taking time and labor and delaying the cooking. This is performed in the open air with consequent loss of heat and aromas, and drying of the food.

In this apparatus (closed to all draughts) in a cooking vessel with a protective top that practically confines the vapors of cooking to the meat itself, the vapors of cooking (among which is steam) are in close proximity to the meat and due to the radiated heat from the inside surfaces of the "cooking vessel" an automatic basting takes place—without loss of heat or moisture or of flavors. Basting of the under side of the roast is accomplished by the spattering of the overheated gravies which fall to the bottom of the roasting pot.

In accordance with the present invention, some cooking vessels with protective covers are needed. Inside these vessels no glowing radiant heat can penetrate, and the temperature is the same at all points. These vessels are made of material practically impervious to glowing radiant heat. The material has a high heat conductivity as well as a high specific heat. The covers have to be double in order to equalize the temperature throughout the vessel as well as to serve (when desired) as a reservoir for a small quantity of water.

This water is poured in through a closable opening on the outside and on top of the cover. From the reservoir there is a steam passageway leading into the vessel.

When one of these vessels with food therein, and a small amount (½ cup) of water in its cover is placed in the oven to cook; the radiation from the heating element, close to the top of the cover, very quickly heats the cover and causes steam to form from the water in the reservoir. This steam, somewhat superheated from rising in contact with the inside of the hot cover, passes down into the food.

By the time the water in the reservoir has been evaporated and has heated the food and vessel and collected through condensation in the bottom of the vessel, the walls and bottom of the oven have heated sufficiently to cause the water to steam again up and around the food.

If baking, roasting, or cooking without water or steam is required, it is accomplished similarly without water in the reservoir of the cover.

As there are several of these utensils that fit into the oven at the same time and as vapor or odors coming out of one utensil cannot get into one of the other utensils, several kinds of cooking can be carried on at one and the same time, in the same oven.

Since this stove is so designed that cooking can be carried on on its top as well as inside at the same time, from the same heating element, several meal courses can be cooked together with the greatest of economy.

A principal object of the invention is to provide cooking apparatus capable of performing all of its intended functions when supplied with electrical energy from such a limited source as the ordinary house-lighting circuit, and which enables one to cook all kinds of food in any usual manner, for instance by baking, roasting, boiling, steaming, grilling, frying, etc., all without emission of smoke or odor from the apparatus during the cooking operation.

A further object is to provide apparatus of the above type which is not only self-cleaning (to remove all grease or greasy stains deposited upon its inner surface during cooking) but also operative to clean grease or greasy stains from any utensils which may be placed within the oven for the purpose, or even to incinerate food materials, all without emission of smoke or odor from the apparatus.

A further object is to provide apparatus of the type referred to capable of performing the cooking operation quickly and with economy of electrical energy. A further object is to provide improved and novel utensils especially useful in the performance of certain cooking operations in the improved oven herein disclosed, but which, in some instances at least, are useful in other types of oven or cooker.

One embodiment of this invention is disclosed in the accompanying drawings in which Fig. 1 is a view in front elevation of a cooker comprising an oven and a standard therefor;

Fig. 2 is an enlarged cross-sectional view taken along the line 2—2 of Fig. 1, of the oven arranged for cooking on the top thereof;

Fig. 3 is a cross-sectional view taken at right angles to the view in Fig. 2, of the oven arranged for cooking within the oven;

Fig. 4 is an enlarged cross-sectional view of one element of the cooker by which the odor of fumes are eliminated;

Fig. 5 is a plan view of the door handle;

Figure 6:
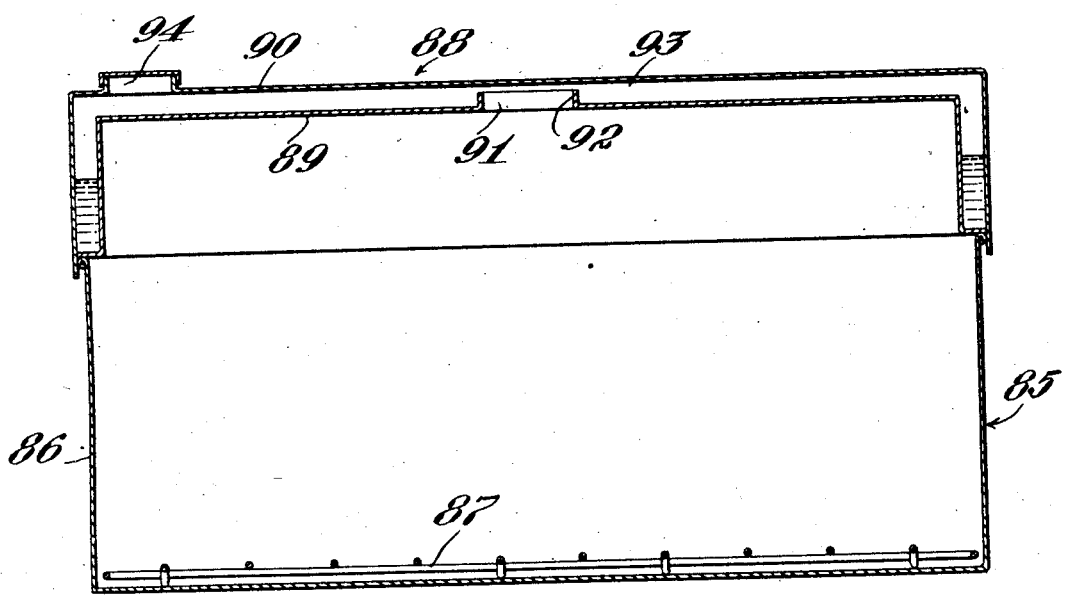
Fig. 6 is a cross-sectional view of a cooking utensil adapted to be used in this cooker.

The cooker shown in the drawings comprises an oven 10 having the cooking chamber 20 (Fig. 2). The walls 11 and base 12 of the oven are preferably of stainless steel or other suitable material and are supported upon a tubular frame 15, which may be of round or square stock as preferred. The top plate 16 of the oven terminates in a continuous downturned flange 17 which laps over the upper edges of the side walls 11. The plate 16 rests upon the heads of screws 18 or equivalent spacers carried by the frame 15 and is thus supported above the frame 15 to which it is secured by screws 19 (Fig. 3) or other suitable means, so that narrow passages are provided between the side walls and the top plate through which gases may escape to the atmosphere. Preferably the flange 17 of the top plate (Fig. 2) contacts the front wall of the oven to prevent escape of gases at the front of the oven. If desired, the flange 17 may be so arranged as to contact one of the side walls also, thus preventing any draught directly across the top of the oven.

The chamber 20 is defined by a lining shell 21 (Fig. 2) preferably of aluminum suitably supported within the oven and spaced from the walls and base thereof. For best results this lining should have a matt finish, as a highly polished surface reflects the energy too completely. In one wall of the shell 21 is formed a door opening 22 which registers with the door opening 23 in the outer wall of the oven. The openings 22 and 23 are normally closed by the hinged door 24. The opening 22 is preferably defined by a bar 25, rectangular in cross section, about which the edges of the shell-forming material are bent (Fig. 2). The top of the shell 21 is domed and in its dome is provided a circular opening 26 which is coaxial with an opening 27 in the top plate 16. The latter opening is bounded by a flange 28.

Removably secured to the dome of the shell 21 is an annular concave hood 30 having a downturned flange 31 at its inner edge. The hood 30 is spaced above the upper surface of the shell so as to form a very narrow passage between the hood and shell. As shown, a plurality of bosses 32 formed on the hood hold the parts in spaced relation with the flange 31 projecting into the opening 26. The flange 31 is spaced from the periphery of the opening 26 a distance substantially equal to the distance the hood 30 is above the dome of the shell. Fixed to the top plate 16 and bearing against the inner face of the flange 28 is a ring 33 so formed as to provide two concentric horizontal lands 34 and 35 and an inner downwardly directed cylindrical flange 36. The inner land 35 as shown in Figs. 2 and 3 is in a horizontal plane slightly below the plane of the land 34 and the cylindrical flange 36 enters the opening in the hood 30 and preferably bears against the flange 31 of the hood. Normally, an annular disk 37 rests on the land 35. To the under face of the disk are secured a cup 38 of mesh wire or screen, of Monel metal or other suitable material, and a cylinder 39 (Figs. 2 and 4). The cup 38 and cylinder 39 are provided with outwardly projecting flanges 40 and 41, respectively (Fig. 4) which are attached to the disk 37 by bolts 42. Washers 43 embracing the bolts slightly separate the flanges 40 and 41.

The disk 37 comprises two spaced flanged plates united by the bolts 42 and rests upon the land 35, with the cup 38 and cylinder 39 disposed in the opening defined by the flange 36.

Suspended from the upper bars of the frame 15 and secured thereto by the screws 18 are depending straps 45 comprising horizontal flanges 46 on which is supported a domed ring 47 above and spaced from the hood 30. Loosely resting upon the ring 47 is a mantle of aluminum foil 48.

A cover 50 (Fig. 2) having a peripheral flange 51, is adapted normally to close the opening 27 in the top plate 16. The cover is of the double walled type, having a space 52, between upper and lower walls, in which is arranged a sheet of aluminum foil 53. Fixed to the lower wall of the cover is a circular hollow boss 54 which enters and substantially fills the central opening in the disk 37. The under face 55 of the boss is upwardly concave and constitutes a reflector. In order to facilitate raising the cover 50, a depression 56 is formed in the upper surface thereof across which extends a bar 57 which may engage a stove-lid lifter.

In the dome of the chamber 20 is mounted a heating unit 60. Preferably the dome is of substantially parabolic curvature with the heating unit substantially at the focal point. This unit comprises an annular core 61 of flat rectangular section and of refractory material on which is wound a resistance coil 62. The unit is here shown supported by one or more arms 63 attached to the dome of the shell 21 and the hood 31. Electrical energy is supplied to the unit in any desired manner as through wires 64 leading from a terminal 65 mounted upon one side wall of the oven and with which the usual electrical connections (not shown) will be made, the unit thus becoming a source of glowing radiant energy.

Any suitable means may be employed for supporting shelves within the chamber 20. For example, as shown, rods 66 are fixed to the side walls (Fig. 3) upon which racks or shelves 67 may be removably supported.

The door 24 is mounted upon hinges 70 (Fig. 2) and comprises an outer wall 71 and an inner wall 72. The outer wall 71 is formed of flanged plates 73 and 74 assembled with the flange of the plate 73 surrounding the flange of the plate 74, thus providing an air space 75. The inner wall 72 is formed by an outwardly flanged plate 77 carried by, but out of contact with the plate 74, and connected thereto by rivets, screws, pins or the like 78. A sheet 79 of aluminum foil is arranged within the space between the outer and inner walls to increase the insulating properties of the door. The plates 73 and 74 of the outer wall 71 are preferably of stainless steel and the plate 77 is preferably of aluminum having a smooth inner face. The forward surface of the thin aluminum lining shell 21 at the edge of the door opening 22 is flat due to the rigid rectangular bar 25 against which it lies, so that the inner wall 77 of the door makes close contact with the lining to seal the opening 22. The outer wall 71 of the door overlaps the edges of the opening 23 and is in close relation therewith when the door is closed. The door is provided with a handle 80 of stainless steel fixed at its ends to the outer plate 73 and provided intermediate its ends with a loop 81 to be grasped by the hand, and with inturned bends 82 (Fig. 5) between the loop 81 and the ends of the handle, whereby overheating of the loop 81 is prevented.

When food is cooking in the oven the vapors which are generated must pass between or in contact with highly heated surfaces before escaping, so that any odors or smoke are eliminated. The vapors so evolved may escape by passing through or in contact with the hot mesh which forms the cup 38, or they may pass between the flange 31 and the inner edge of the opening 26, thence through the narrow passage between the shell 21 and the hood 30, and thence out between the ring 47 and shell 21 into the space below the top plate 16, from which they may escape between the flange 17 and the side wall 11. The screen mesh cup 38 being near the heating element 60, quickly becomes very hot so that any odors or smoke passing through or in contact with the screen are broken down to colorless and odorless products.

The opening defined by the ring 33 is normally nearly closed either by the cover 50 or by the bottom of a cooking utensil. Neither the cover 50 nor a cooking utensil by which it may be replaced would ordinarily fit tight against the top 16 of the cooker, but any vapors which pass up through the screen cup 38 or between the part 41 and the flange of the screen cup are de-odorized and made colorless before escaping from beneath the cover of the cooking utensil.

The dome of the shell 21 and the flange 31 are in the direct path of the glowing radiant energy emanating from the unit 60 and are thus quickly brought to a high temperature while the hood 30 is heated by conduction from the flange 31. As a result, odors or smoke traveling through the passages are broken down to unobjectionable forms so that the gases which escape to the atmosphere through the outlet below the flange 17 are odorless and smokeless. The domed ring 47 acts as a reflector to reflect back any heat energy which escapes through the hood 30, thus helping to increase the temperature of the hood and reducing energy loss.

In order, so far as possible, to reduce the generation of objectionable odors and smoke (the latter tending to obscure the glowing radiant energy from the source 60) special forms of cooking utensil have been devised which are of especial value in connection with the cooker herein disclosed, but which are also adapted for more general use.

Thus in Fig. 6 there is illustrated a utensil 85 comprising a receptacle or container 86 in which is preferably arranged a rack 87 or similar device on which the food rests during the cooking—the utensil also comprising a cover or lid 88. The cover 88 consists of an inner shell 89 and an outer shell 90 spaced apart but joined at their peripheries. In the inner shell 89 there is formed an opening 91 defined by a flange 92 projecting upwardly into the space 93 between the shells. In the outer shell 90 is formed an opening 94, normally closed, through which water may be introduced into the space 93. However, the water level should always be below the upper edge of the flange 92 so that it will not enter the receptacle through the opening 91. When vegetables are to be steamed, for example, they are placed on the rack in the receptacle 85 and a small quantity of water is placed in the space 93. Since the lower part of the receptacle is mostly screened from the direct action of the glowing radiant energy from the source, it only becomes heated by conduction through the side walls of the oven chamber. However, the water within the cover soon begins to steam and the steam passes down through the opening 91 to heat the vegetables in the cooking chamber. As the parts become hotter the water thus collecting in the receptacle is raised to the boiling temperature and the entire interior of the receptacle becomes filled with steam at a pressure slightly above atmospheric.

The dome of the shell 21 and the flange 31, being in the direct path of the glowing radiant energy emanating from the unit 60, are quickly brought to a high temperature and the hood 30 is heated both by conduction from the flange 31 and by the hot vapor passing thereover. The domed ring 47 acts as a reflector to reflect back any heat energy which escapes through hood 30, thus helping to increase the temperature of the hood 30 and reducing energy loss. As a result, odors or smoke traveling through the passages are broken down to unobjectionable forms so that the gases which escape to the atmosphere through the outlet below the plate 16 and over the frame 15 are odorless and smokeless.

Figure 8:
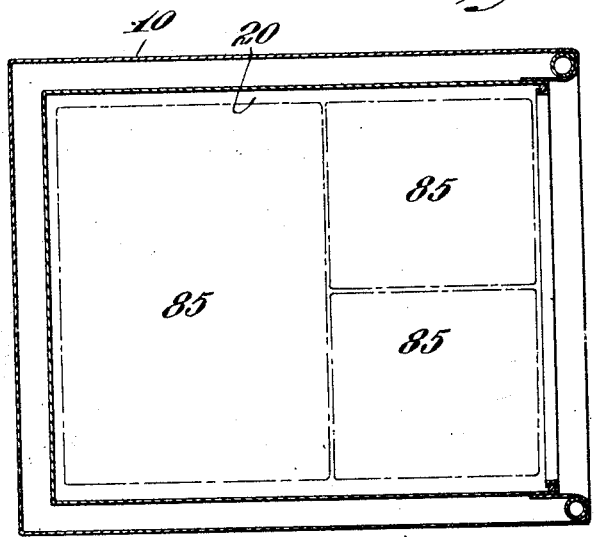
Fig. 8 is a plan view illustrating how a plurality of utensils may be placed in the oven.

As illustrated in Fig. 8, utensils (such as the utensil 85) may be furnished in different sizes, for example, one large and two small receptacles may be furnished, such receptacles collectively substantially filling the cooking chamber of the oven. Since the covers of these receptacles fit fairly snugly and since a slight pressure is thus developed in each receptacle when heated, any odoriferous vapors generated within the container must move outwardly (through the narrow crevice between the cover and receptacle) so that foods of different character may be cooked in the several receptacles without danger of contamination of one by the odor of another. Moreover, the provision of the several covered utensils permits cooking by different methods concomitantly. For instance roasting may be done in the large container, no water being introduced into the cover; boiling may be done in a second utensil having its receptacle supplied with sufficient water to immerse the articles being cooked, but with no water in the cover; while in the third receptacle steaming may be carried on by placing water in the cover but no water in the receptacle.

For broiling steaks, chops or other food the utensil 95 (Fig. 7) is provided. This utensil comprises a base 96 and a rack 97 supported thereby and on which the food is placed for cooking. The base 96 preferably of thin sheet metal, comprises an inner pan 98, and may consist of a single thick pan-like member of a material having a high specific heat, for example aluminum, but as here shown supported at its periphery upon an outer, usually thicker pan 99. The pans 98 and 99 are preferably separable and into the space between them a quantity of water is introduced to keep the inner pan 98 cool. When in use, the food to be grilled is placed upon the rack 97 and exposed to glowing radiant energy from the source 60. Any fat, grease or juices which drip from the food fall into the relatively cool pan 98 and thereby maintain a temperature so low that they do not smoke or char. Thus the evolution of heavy fumes is avoided, and the space in the cooking chamber is kept practically free of smoke and clear so that the radiant energy from the source is not obscured. Obviously, the device of Fig. 7 is advantageous for use in cooking in any type of apparatus having a heating element disposed above the cooking chamber.

When cooking on the top of the oven, as for instance when using a griddle for cakes or the like, the placing of one of the utensils 85 in the oven so that its top is just below the unit 60 will cause the glowing radiant energy to be reflected upwardly to the top of the oven so that practically all the heat is available for the desired purpose.

Figures 7, 9:
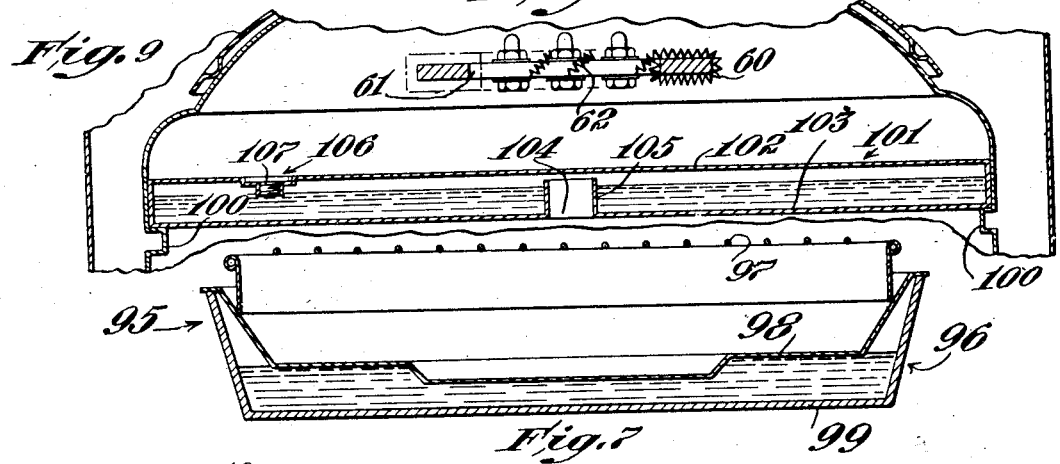
Fig. 7 is a similar view of other such cooking utensils.
Fig. 9 is a fragmentary vertical section illustrating an arrangement wherein an energy shield is interposed between the source of glowing radiant energy and the cooking space.

Fig. 9 illustrates an appliance by means of which the major part of the cooking chamber may be shielded from the direct effects of glowing radiant energy from the source 60 and a substantial degree of humidity maintained in the cooking space if desired. As illustrated in Fig. 9, the inner shell or wall of the cooking chamber is provided near the top of the chamber with inwardly directed ledges 100 upon which a removable energy shield 101 is mounted, such shield having the general appearance of a thick shelf, but in reality comprising upper and lower walls 102 and 103 respectively, suitably spaced by side walls. The lower wall may, if desired, be slightly depressed at its center. This shield or container 101 is so shaped as to make an extended contact with the ledges 100 and thus to insure good heat conduction from the shield to the side walls.

The lower wall 103 of this shallow container has an aperture 104 defined by an upwardly directed flange 105 extending almost, but not quite, up to the inner surface of the upper wall 102. The upper wall is provided with a filling opening at 106 having a closure plug 107 preferably so arranged that when closed the upper surface of the plug is substantially flush with the top surface of the wall 102. By placing this shield in position with a small quantity of water within it, the lower part of the cooking chamber is shielded from the direct action of the glowing radiant energy from the source 60 and the major part of the heat for heating the cooking space is received by conduction down along the side walls. As the water within the container becomes hot, steam passes down through the opening 104 into the cooking chamber and thus maintains a moist atmosphere therein so long as there is any water remaining in the container. The use of this shield permits such operations as the slow baking of bread without danger of carbonizing the upper surface of the material being cooked by the direct action of radiations from the source of glowing radiant energy. By the use of this shield, substantially the entire oven chamber is made available as a large unit for every kind of cooking in which direct exposure of the food to the glowing radiant source is not required or desirable.

The oven 10 shown in Fig. 1 may be mounted upon a standard or pedestal 110 which includes a plurality of posts 111 and a plurality of shelves 112 for the convenient storage of utensils. As here illustrated, the shelves are of sheet metal and have their front and back edges curled downwardly so as partly to embrace cross rods 114, and thus hold the shelves in place. Hooks 115 on the edges of the shelves permit the hanging of utensils therefrom. Projecting downwardly from the four lower corners of the oven are a plurality of short legs 113 (Fig. 1) which enter the top ends of the tubular posts 111. The oven proper is thus removably supported by the standard or pedestal, but may be taken off from the pedestal and placed upon a table or any other convenient support.

While embodiments of each of the various features of this invention have been shown and described, it will be understood that the invention is not limited thereto and that other embodiments thereof may be made without departing from the spirit and scope of this invention.

I claim:

1. An electric cooker comprising an oven including a cooking chamber defined by a lining shell closed at the bottom but having an opening in the top thereof, an oven body enclosing said chamber and including a top plate, and a ring carried by the top plate, said ring including a cylindrical flange concentric with the opening in the lining shell, and an annular hood carried by the shell.

2. An electric cooker comprising an oven including a cooking chamber defined by a lining shell having an opening in the top thereof, an oven body enclosing said chamber and including a top plate, and a ring carried by the top plate, said ring including a cylindrical flange, and an annular hood carried by the shell, the ring, flange and hood being concentric with the opening in the lining shell.

3. An electric cooker comprising an oven including a cooking chamber defined by a lining shell having an opening in the top thereof, an oven body enclosing said chamber and including a top plate having an opening therein which registers with the opening in the lining shell, and a ring carried by the top plate, said ring including a cylindrical flange, and an annular hood carried by the shell and having at its inner periphery a flange which enters the opening in the shell and which surrounds the cylindrical flange of said ring and contacts therewith.

4. An electric cooker comprising an oven including a cooking chamber defined by a lining shell having an opening in the top thereof, a source of glowing radiant energy within said chamber below the opening, an oven body enclosing said chamber and including a top plate having an opening therein which registers with the opening in the lining shell, and a cup of mesh-wire supported by the top plate within said openings which cup becomes highly heated by the source and thereby consumes smoke or odors tending to escape from the chamber through said openings.

5. An electric cooker comprising an oven including a cooking chamber defined by a lining shell having an opening in the top thereof, a source of glowing radiant energy immediately below said opening, an oven body enclosing said chamber and including a top plate, and a ring carried by the top plate, which ring includes a horizontal land and a cylindrical flange, an annular disk supported by said land, and a cup of mesh-wire carried by the disk and disposed within the flange of the ring, and arranged to become highly heated by radiant energy from said source.

6. An electric cooker comprising an oven including a cooking chamber defined by a lining shell having an opening in the top thereof, an oven body enclosing said chamber and including a top plate, and a ring carried by the top plate, said ring including a horizontal land and a cylindrical flange that enters the opening in the lining shell, an annular disk supported by said land, a cup of mesh wire carried by the disk and disposed within the cylindrical flange of the ring, and a hollow cylinder carried by the disk and interposed between the cup and the cylindrical flange of the ring.

7. An electric cooker comprising an oven including a cooking chamber defined by a lining shell having an opening in the top thereof, a source of glowing radiant energy arranged directly below said opening, an oven body enclosing said chamber and including a top plate having an opening therein which registers with the opening in the lining shell, and a ring carried by the top plate, said ring including a horizontal land and a cylindrical flange which enters the opening in the lining shell, an annular disk supported by said land, a cup of mesh-wire carried by said disk and disposed within the opening defined by said flange, and a cover for closing the opening in the oven body, said cover including a boss designed to project into and substantially to close said cup.

8. An electric cooker comprising an oven including a cooking chamber defined by a lining shell having an opening in the top thereof, a source of glowing radiant energy directly below said opening, and an annular hood supported by said shell, said hood being spaced from the shell to define a narrow passage constituting an outlet for gaseous substances, said hood and the adjacent part of the shell being so arranged as to become highly heated by the energy emitted by said source.

9. An electric cooker comprising an oven including a cooking chamber defined by a lining shell having an opening in the top theref, a source of glowing radiant energy within the shell below said opening, and an annular hood supported by said shell, said hood having a downwardly directed flange at its inner periphery, said flange being spaced from the edge of the opening and the hood being spaced from the shell thereby to define a narrow outlet passage, the walls of said passage being highly heated by the energy from said source.

10. An electric cooker comprising an oven including a cooking chamber defined by a lining shell which is spaced from the base and walls of the oven body, said shell having an opening in the top thereof, a source of glowing radiant energy located in the top of said chamber below said opening, the top outer plate of said oven body having a peripheral flange which overlaps the upper parts of the side walls and which is, in part at least, spaced from the side walls to provide an outlet, and an annular hood supported by the top of the lining shell, said hood being spaced from the shell to form a narrow passage through which gaseous substances may escape to said outlet, said hood and shell being arranged to be heated by the energy from said source, so that any odors or smoke which enter said passage are consumed before they reach the outlet.

11. An electric cooker comprising an oven having an outer casing and including a cooking chamber defined by a lining shell spaced from the outer casing of the oven, said shell having an opening in the top thereof, a source of glowing radiant energy in the top of said chamber below said opening, the outer casing of the oven having an outlet near its top, means providing an escape passage leading from the upper part of said cooking chamber to the outlet, said passage having portions at least of its walls which are highly heated by energy from said source, and a downwardly concave ring arranged to reflect heat energy toward said walls.

12. An electric cooker comprising an oven including an outer casing and including a cooking chamber defined by a lining shell spaced from the outer casing of the oven, said shell having an opening in the top thereof, a source of glowing radiant energy in the top of said chamber below said opening, the outer casing of said oven having an outlet near its top, an annular hood supported by the top of the lining shell and having a flange which extends into the opening in the shell, said hood being spaced from the shell to form a narrow outlet passage, a downwardly concave ring above and spaced from said hood to form a continuation of the outlet passage, said passage leading to said outlet, and a layer of aluminum foil resting upon said concave ring.

13. An electric cooker comprising an oven including a cooking chamber defined by a lining shell and spaced from the base and walls of the oven body, said shell having an opening in the top thereof leading into the space between the lining shell and the oven body, a source of glowing radiant energy in the upper part of the cooking chamber, said oven body including a top plate supported by the side walls of the oven but spaced therefrom to provide an outlet between the side walls and top plate, said top plate including peripheral flanges which overlap the top portions of the side walls.

14. An electric cooker comprising an oven including a cooking chamber defined by a lining shell spaced from the base and walls of the oven body, said shell having an opening in the top thereof leading into the space between the lining shell and the oven body, a source of glowing radiant energy in the upper part of said chamber, said body including a top plate supported by the side walls of the oven but spaced therefrom to provide an outlet between the side walls and top plate, said top plate including peripheral flanges which overlap the top portions of the side walls, the flange being in contact with one at least of the side walls.

15. An electric cooker comprising an oven including a cooking chamber defined by a lining shell having an opening in the top thereof, a source of glowing radiant energy in said chamber below and adjacent to the opening therein, an oven body enclosing said lining shell and having an opening therein at the top in register with the opening in the lining shell, a cover for closing the opening in said body, and a cup of mesh-wire supported by the body above the opening in the chamber so as to become highly heated by said source of energy.

BUTLER AMES.